Figure 27:
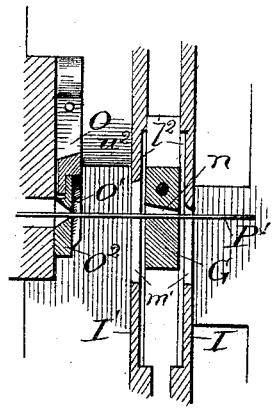

(No Model.) 6 Sheets—Sheet 1.
F. P. ROSBACK.
BOOK STAPLING MACHINE.
No. 435,614. Patented Sept. 2, 1890.
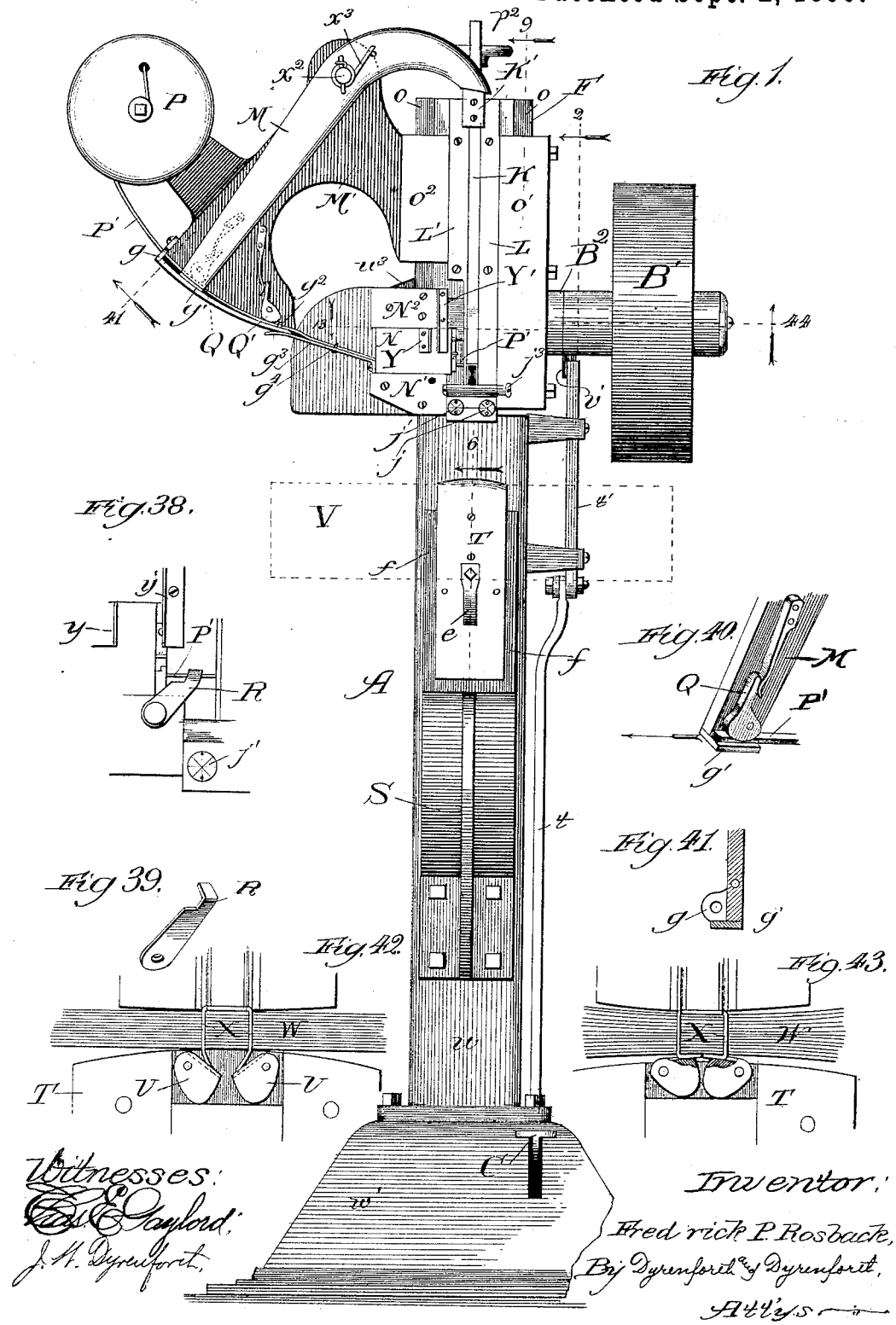
Witnesses:
Geo. E. Gaylord
J. H. Dyrenforth
Inventor:
Fred'rick P. Rosback,
By Dyrenforth & Dyrenforth,
Att'ys

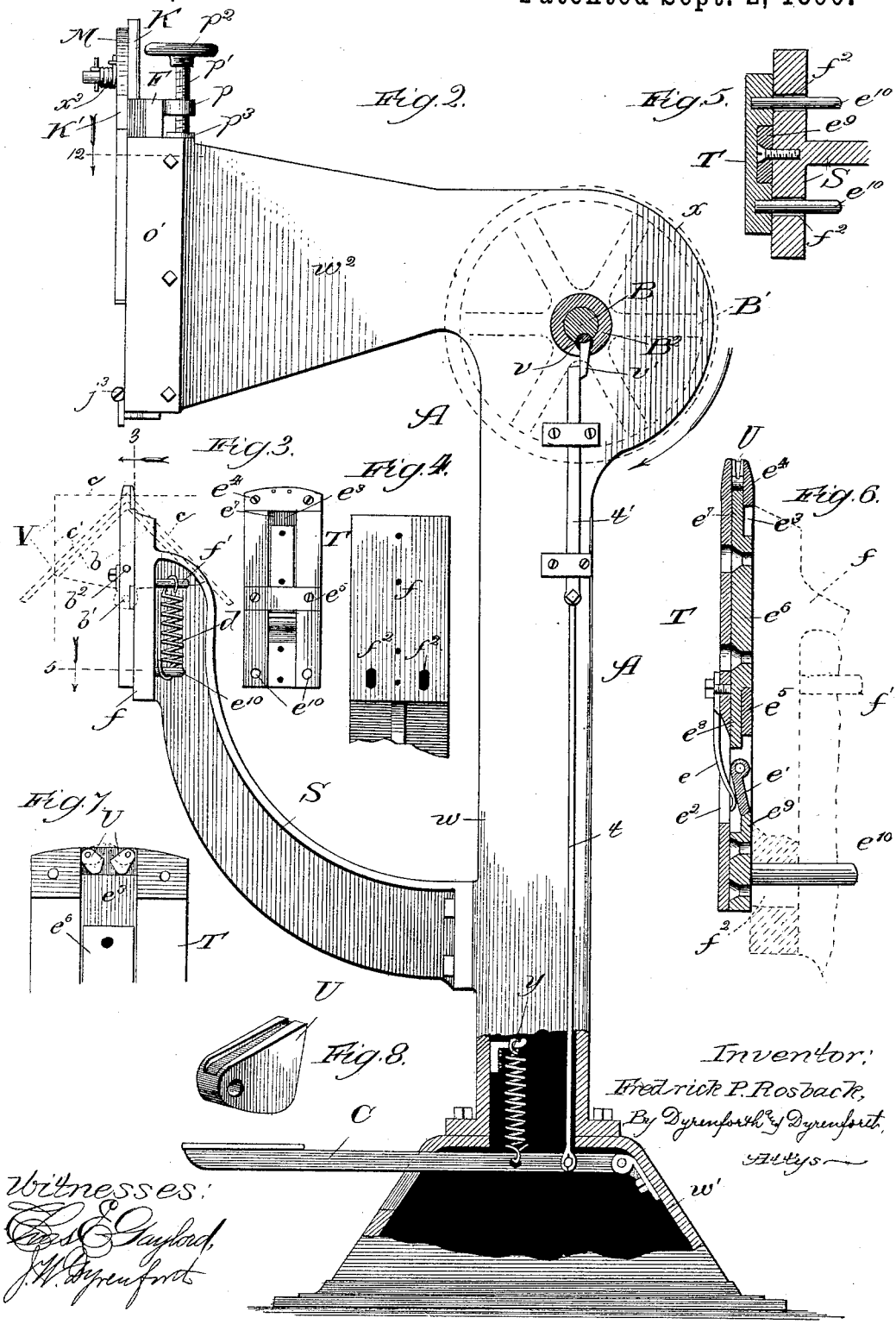

(No Model.) 6 Sheets—Sheet 3.
F. P. ROSBACK.
BOOK STAPLING MACHINE.
No. 435,614. Patented Sept. 2, 1890.
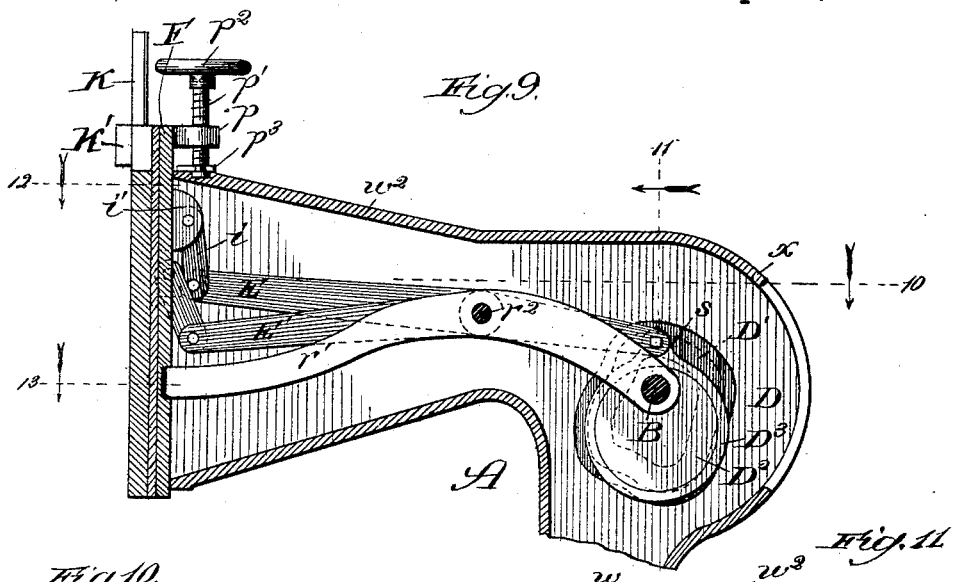
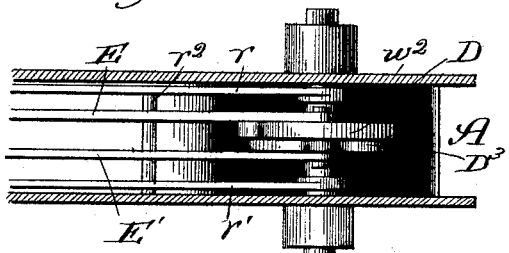
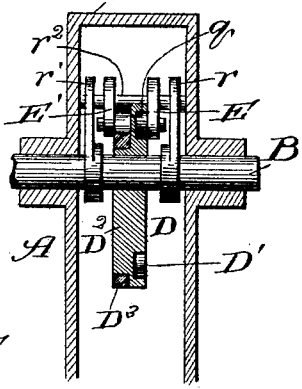
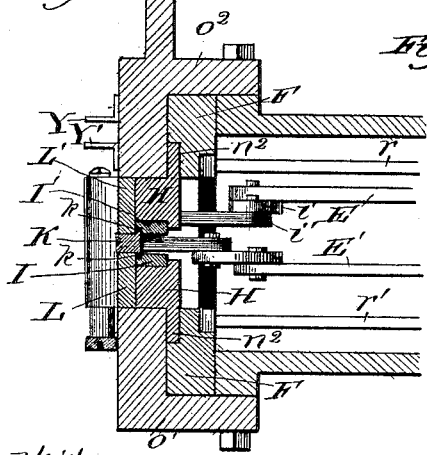
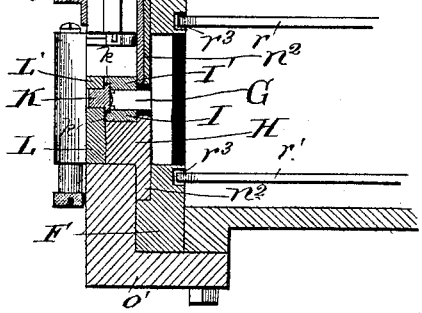
Witnesses:
Chas. E. Gaylord,
J. N. Dyrenforth.
Inventor:
Fredrick P. Rosback,
By Dyrenforth & Dyrenforth,
Atty's (No Model.) 6 Sheets—Sheet 4.
F. P. ROSBACK.
BOOK STAPLING MACHINE.
No. 435,614. Patented Sept. 2, 1890.
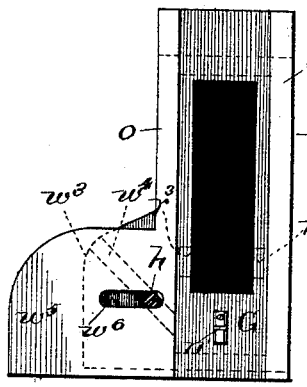
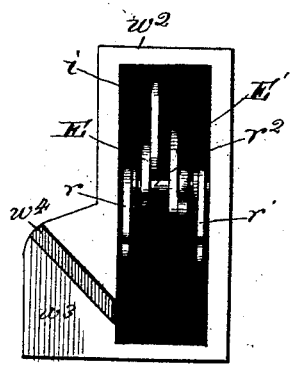
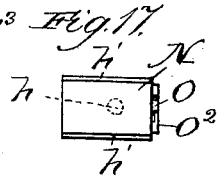
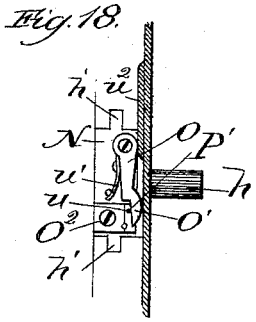
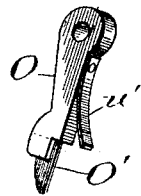
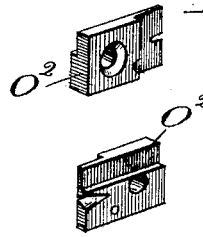
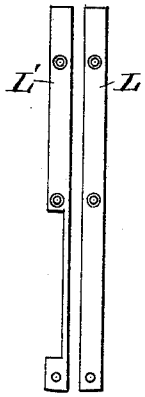
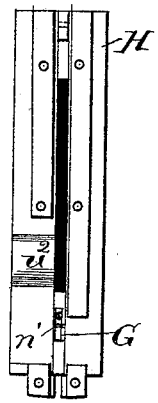
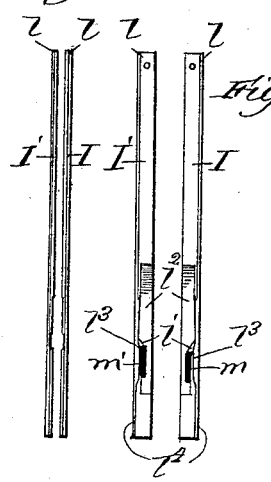
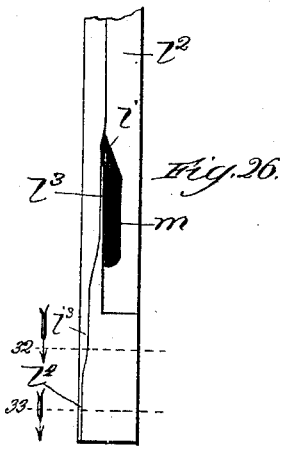
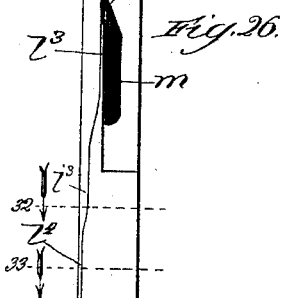
Witnesses:
Chas. E. Gaylord
J. H. Dyrenforth
Inventor:
Fredrick P. Rosback,
By Dyrenforth & Dyrenforth,
Attys.

(No Model.) 6 Sheets—Sheet 5.

F. P. ROSBACK.
BOOK STAPLING MACHINE.

No. 435,614. Patented Sept. 2, 1890.

Witnesses:

Inventor:
Fredrick P. Rosback,
By Dyrenforth & Dyrenforth,
Attys (No Model.) 6 Sheets—Sheet 6.
F. P. ROSBACK.
BOOK STAPLING MACHINE.
No. 435,614. Patented Sept. 2, 1890.
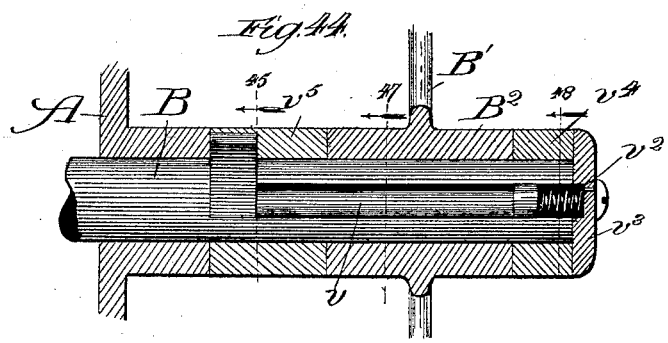
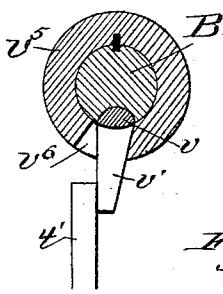
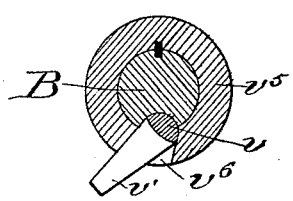
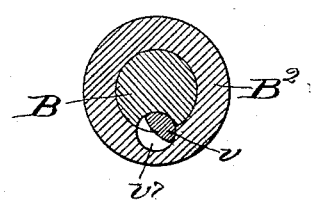
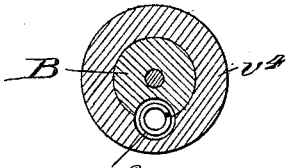
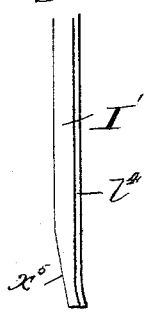
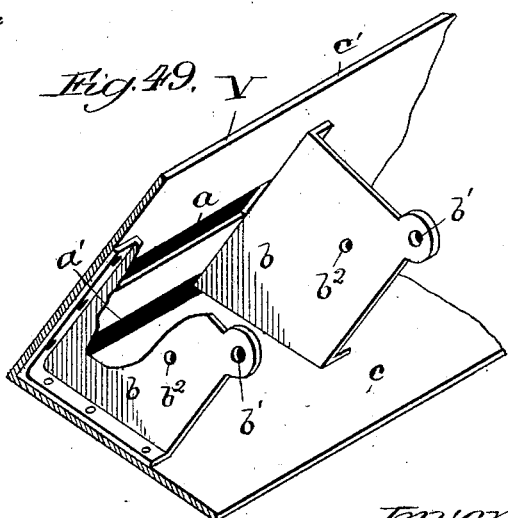
Witnesses:
Chas. E. Gaylord,
J. A. Dyrenforth.
Inventor:
Fredrick P. Rosback.
By Dyrenforth & Dyrenforth,
Attys.
THE NORRIS PETERS CO., PHOTO-LITHO., WASHINGTON, D. C.

UNITED STATES PATENT OFFICE.

FREDRICK P. ROSBACK, OF CHICAGO, ILLINOIS.

BOOK-STAPLING MACHINE.

SPECIFICATION forming part of Letters Patent No. 435,614, dated September 2, 1890.

Application filed August 8, 1889. Serial No. 320,133. (No model.)

*To all whom it may concern:*

Be it known that I, FREDRICK P. ROSBACK, a citizen of the United States, residing at Chicago, in the county of Cook and State of Illinois, have invented a new and useful Improvement in Book-Stitching Machines, of which the following is a specification.

My invention relates to an improvement in the class of machines commonly referred to by the term "stitcher," and employed for binding books by forming and driving staples through the leaves to be secured together; and it relates particularly to an improvement in the kind of stitcher in which wire is fed to a staple-forming mechanism, which severs from the supply the section of wire to be formed into a staple, then forms the staple, and after the formation drives it into the work.

The more important objects of my improvement are to provide a stitcher which shall serve reliably to drive the staples it forms and without impairing them or injury to the machine through any desired thickness of the material to be bound, the driving, staple-forming, and wire-feeding mechanisms of which shall be readily adjustable to the thickness of the book or portion thereof to be stitched and with reference to the support for the work.

Further objects are to provide a construction of table and means for adjustably supporting it, whereby it may be readily converted from a table into a saddle and from a saddle into a table; to provide an improved construction of clincher, being the device for bending the ends of the staples to secure them after they have been passed through the work, and to provide a generally-improved construction of stitcher.

My improved machine is fully illustrated in all its details and in a manner to demonstrate diagrammatically different stages of its operation in the accompanying drawings, in which—

Figure 28:
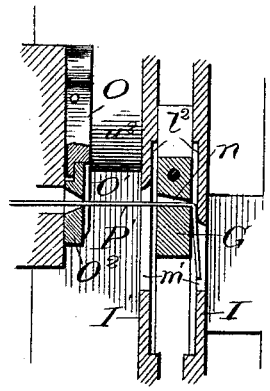
Figure 29:
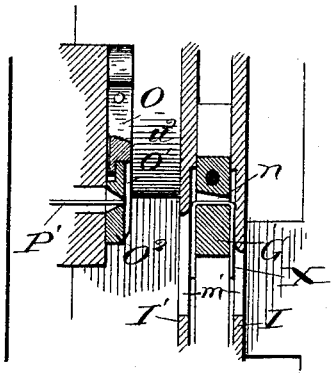
Figure 30:
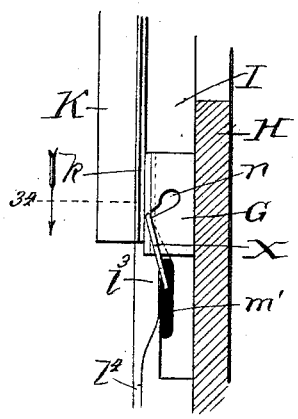
Figures 31, 32, 33:
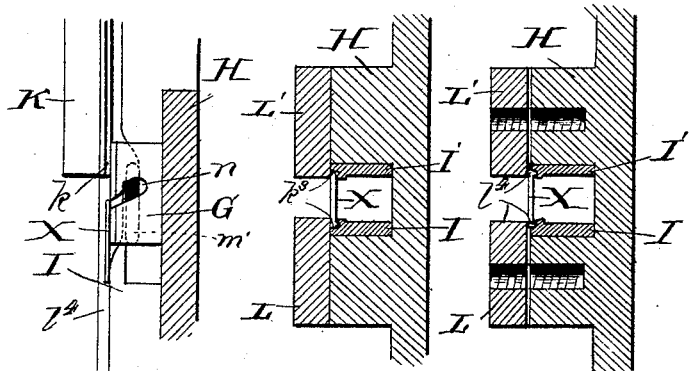
Figure 34:
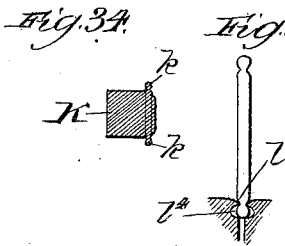
Figure 35:
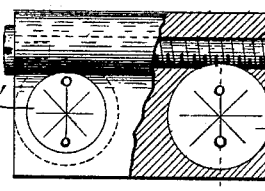
Figure 36:
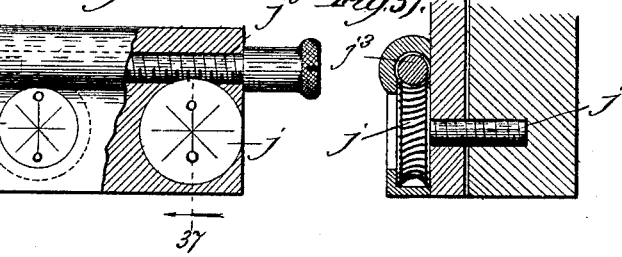
Figure 37:
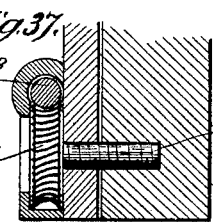

Figure 1 is a view in front elevation of my improved machine; Fig. 2, a broken sectional side elevation of the same, the section being taken on the line 2 of Fig. 1 and viewed in the direction of the arrow; Fig. 3, a rear elevation of the front vertically-reciprocating spring-head shown at the line 3 of Fig. 2; Fig. 4, a broken face view of the bracket portion of the standard with the spring-head removed; Fig. 5, a section taken on the line 5 of Fig. 2 and viewed in the direction of the arrow; Fig. 6, a section taken on the line 6 of Fig. 1 and viewed in the direction of the arrow; Fig. 7, a broken view, in rear elevation, of the clincher device having the upper rear cross-plate removed and showing by dotted lines the clincher-pawls in their raised position; Fig. 8, an enlarged perspective view of one of the clincher-pawls; Fig. 9, a broken sectional view showing the mechanism inside the upper or horizontal portion of the standard, the section being taken on the line 9 of Fig. 1 and viewed in the direction of the arrow; Fig. 10, a section taken on the line 10 of Fig. 9 and viewed in the direction of the arrow; Fig. 11, a section taken on the line 11 of Fig. 9 and viewed in the direction of the arrow; Fig. 12, a section taken on the line 12 of Figs. 2 and 9 and viewed in the direction of the arrows; Fig. 13, a section taken on the line 13 of Figs. 1 and 9 and viewed in the direction of the arrows; Fig. 14, a view in front elevation of the vertically-adjustable bed-plate with the forward end of the hood of the standard behind it, shown mainly by dotted lines; Fig. 15, a perspective view of the stationary obliquely-slotted anvil-block through which the wire is fed and in which it is held while being bent toward its opposite ends to form a staple; Fig. 16, a view in front elevation of the hood portion of the standard, showing through its opening the links for connecting the levers within it with the plunger and with the vertically-reciprocating head and the pivotal arms flanking the levers, and which are to engage at their forward ends with recesses provided in the rear side of the vertically-adjustable bed-plate, all as shown in Fig. 9; Fig. 17, a face view of the knife-supporting block, showing the guide-pin on its rear side by dotted lines; Fig. 18, a sectional view showing the wire-severing mechanism and the cam for actuating it; Fig. 19, a perspective view of the cutter. Figs. 20 and 21 are respectively front and rear perspective views of a detail; Fig. 22, a face view of the reciprocating head carrying the knife-cam and having the plates represented in Fig. 3 removed. Fig. 23 shows in front elevation the two front guide-plates for the driver and staple in normal relative position and detached; Fig. 24, an edge view of the staple-formers detached and shown in normal relative positions; Fig. 25, a face view of each of the staple-formers shown in Fig. 24; Fig. 26, an enlarged broken face view of the lower end of one of the staple-formers shown in Fig. 25. Figs. 27, 28, and 29 are broken sectional views of the staple-forming mechanism, illustrating progressively the relative positions of parts and their operations in forming a staple. Fig. 30 is a sectional view showing the staple as being guided out of the anvil-block in which it is formed into oblique side channels in the vertically-reciprocating formers. Fig. 31 shows the staple as guided into the channels which hold it in the path of the plunger. Figs. 32 and 33 are sections indicating the shape of the channels for guiding a staple to and holding it in the path of the plunger, the sections being taken, respectively, on the lines 32 and 33 of Fig. 26 and viewed in the direction of the arrows. Fig. 34 is a section taken on the line 34 of Fig. 30 and viewed in the direction of the arrow. Fig. 35 is a broken sectional view showing an enlarged top view of the finished staple; Fig. 36, a face view of the adjusting mechanism for the outer staple and driver guide-bars; Fig. 37, a section taken on the line 37 of Fig. 36 and viewed in the direction of the arrow; Fig. 38, a broken face view of the lower portion of the mechanism for controlling the feed of the wire, illustrating an adjustable attachment for controlling long lengths of wire fed to produce the larger staples; Fig. 39, a perspective view of the attachment shown in Fig. 38; Fig. 40, a broken perspective view of a spring-held wire-clamp on the feed-arm; Fig. 41, a section taken on the line 41 of Fig. 1 and viewed in the direction of the arrow; Fig. 42, a broken view illustrating the initial operation of the clincher device; Fig. 43, a similar view illustrating the final operation of the clincher device in bending the ends of a staple protruding from the under side of the work; Fig. 44, an enlarged bottom sectional elevation taken on the line 44 of Fig. 1 and viewed in the direction of the arrow; Fig. 45, a section taken on the line 45 of Fig. 44 and viewed in the direction of the arrow; Fig. 46, a view like that illustrated in Fig. 45, but showing the parts of the clutch in different relative positions; Figs. 47 and 48, sections taken, respectively, on the lines 47 and 48 of Fig. 44 and viewed in the direction of the arrows; Fig. 49, an enlarged partly-broken bottom perspective view of the adjustable and convertible table; and Fig. 50, an edge view like that shown in Fig. 24, but enlarged and illustrating a modified construction of the flanged groove of a staple-forming bar.

The entire mechanism may be sustained on any suitable form of support; but the form of support I have found most suitable for the purpose, but to which I do not wish to be understood as limiting my improvement, is that illustrated in the drawings, and which comprises a hollow metal standard A, involving a vertical portion $w$, extending from an expanded hollow base $w'$ and terminating at its upper end in a horizontally-extending hood $w^2$, bulging at its rear end, as shown at $x$, Figs. 2 and 9, and bell-shaped toward its mouth, and provided at one side of its mouth (the left side looking toward the front end of the hood) with an ear $w^3$, having an oblique slot $w^4$, Fig. 16, formed in it and extending from the outer upper edge of the ear downward and inward at an angle of forty-five degrees, or thereabout.

B is the rotary shaft, from which all the parts hereinafter described (except the brake) are actuated, and which is journaled in opposite sides of the bulging part $x$ of the hood $w^2$ and projects beyond one side of the same. On the projecting end of the shaft B is a belt-pulley B' on an elongated hub $B^2$, held between collars $v^4$ and $v^5$, the latter having an opening $v^6$, Figs. 45 and 46, through which projects a finger $v'$, extending laterally from a pin $v$, about one half of the diameter of which nearly throughout its length fits in a similarly-shaped groove in the shaft B, the other half being turned down to conform to the circumference of the shaft and of the inner surface of the hub. Thus an ordinary form of clutch is provided, whereby when the pin $v$ fits into the recess in the shaft, as in Fig. 45, the pulley revolves without turning the shaft; but when it is turned to extend beyond the shaft into a semi-cylindrical recess $v^7$ in the hub $B^2$ it clutches the hub and produces rotation of the shaft with the belt-pulley. I give to the pin $v$ a normal tendency to project beyond the circumference of the shaft by means of a spring $v^2$, Fig. 44, secured at one end to a cap $v^3$ at the outer end of the collar $v^4$ and at its inner extremity to the adjacent end of the pin $v$.

C is a pedal fulcrumed at one end inside the base $w'$, as shown in Fig. 2, and extending thence beyond the forward side of the base, being sustained between its extremities by a spring $y$, and from the pedal extends vertically along the side of the part $w$ of the standard a rod $t$, pivoted at its lower end to the pedal and having pivotally connected with its upper end a link $t'$, passing through guides on the side of the standard A into the path of the finger $v'$. When the finger $v'$ comes against the brake afforded by the rod $t$ and link $t'$, it is turned against the resistance of the spring $v^2$ to turn the pin $v$ to conform to the recess $v^6$ in the shaft, thereby preventing rotation of the latter; but when the brake is removed from the path of the finger by bearing down on the pedal and the groove in the shaft comes coincident with the groove $v^7$ in the hub the spring forces the pin $v$ to extend into the groove $v^7$, and thus clutch the belt-pulley to the shaft B.

D, Fig. 9, is a cam-block affording a combined cam and eccentric, the cam being in the form of a peculiarly-shaped groove D', as indicated by dotted lines in said figure, on one side of the cam-block, and the eccentric $D^2$ being in the form of a disk extending from the opposite side of the cam-block, with which it is preferably integral, and having the shaft B extending eccentrically through it, the eccentric $D^2$ being encircled by a close-fitting collar $D^3$, having a perforated ear $s$ extending from its periphery.

E and E' are levers, Figs. 9 to 12, flanked, respectively, by arms $r$ and $r'$, and all pivotally connected together near their centers by a pin $r^2$. The shaft B passes through the rear ends of the arms $r$ and $r'$, which surround it loosely, while the rear end of the lever E is provided with a thimble $q$, Fig. 11, which enters the cam-groove D', and the rear end of the lever E' is pivotally connected with the ear $s$ on the collar $D^3$ of the eccentric $D^2$. Thus it will be seen that when the cam-block D, which is rigidly secured to the shaft B, rotates with the latter the eccentric $D^2$ rocks the lever E' with a regular up-and-down motion, while the cam D' rocks the lever E with an irregular up-and-down motion, and that raising or lowering of the arms $r$ and $r'$ toward their forward ends similarly moves the levers toward their adjacent ends, but without altering the relative positions of the cam and eccentric and their respective levers. It may here be mentioned that raising and lowering of the arms $r$ and $r'$ is produced by adjusting the bed-plate, (which supports the wire feeding and severing and the staple forming and driving mechanisms, all as hereinafter described,) according to the thickness of the work and the length of staple to be formed with regard to such thickness.

F is the bed-plate, Figs. 1, 9, &c., of general rectangular shape, with a rectangular opening through it somewhat shorter and narrower than that at the mouth of the hood $w^2$, on the top of which it is supported at a flange $p$, extending at a right angle from its upper end and having a threaded perforation, constituting it a nut for a screw $p'$, extending through it against a bearing $p^3$ on the top of the hood $w^2$, the screw being provided at its upper end with a hand-wheel $p^2$. The bed-plate F is provided with lateral guide-flanges $o$, and is held from lateral and forward displacement by means of angle-bars $o'$ and $o^2$, extending over its sides from the opposite sides of the hood $w^2$ near its mouth, and to which sides they are bolted, Figs. 12 and 13. In the rear side of the bed-plate F, on opposite sides of its opening and near the base thereof, are two rectangular recesses $r^3$, Figs. 13 and 14, into which extend the forward ends of the arms $r$ and $r'$ in the hood $w^2$. When, therefore, the screw $p'$ is turned in its nut $p$, it raises or lowers the bed-plate F, depending on the direction of turning the screw, and simultaneously raises or lowers the arms $r$ and $r'$, and obviously, also, the levers E and E', owing to the connection of the latter with the arms by means of the pin $r^2$. An ear $w^5$ extends from the lower edge of the bed-plate over the ear $w^3$ on the hood, and is provided with a horizontal slot $w^6$, crossing the oblique slot $w^4$ in the ear $w^3$.

Below the opening in the bed-plate F and rigidly secured to it centrally between its lateral edges is a block G, Figs. 14 and 15, which, from the nature of its purpose, I term an "anvil-block." I provide it in the rectangular form shown, and it is screwed in position through an opening $z$. The anvil-block is provided with a transverse perforation $n$, from which extends obliquely to the front surface of the block a slot $n'$.

H is a rectangular plate, (clearly shown in Fig. 22,) termed by me the "vertically-reciprocating head," and provided centrally and longitudinally with a rectangular slot, which need extend only from near the transverse center of the plate short of its lower end. The head H is flanged laterally, as shown at $n^2$, Figs. 12 and 13, and fits with its flanges $n^2$ between the lateral flanges on the bed-plate F, and it is held to be guided between the flanges on the bed-plate by the angle-plates $o'$ and $o^2$, which overlap its flanges $n^2$. The opposing inner sides of the slot in the head H are cut out to form offsets adapted to receive edgewise the bars I and I', used in forming the staple, and which are clearly illustrated in Figs. 24 to 26. Each of the staple-forming bars comprises a rectangular strip of plate metal adapted to fit edgewise in the offsets provided to extend along the front edges of the opposing sides of the slot in the head H, though they may, if desired, be integral with the vertically-reciprocating head. Toward the lower ends of the bars I and I' they are provided, respectively, with openings or longitudinal slots $m$ and $m'$, the latter being slightly longer than the first-named, for a purpose hereinafter explained. Each of the staple-forming bars has formed in its front inner edge an offset or rectangular groove $l$, extending from its upper end to a point short of the upper end of the longitudinal slot, whence to that end of the slot extends obliquely a shallow channel or groove $l'$. From a considerable distance above each opening $m$ and $m'$ (that is, from a short distance below the longitudinal center of each staple-forming bar) the opposing surfaces of the bars I and I' laterally of the grooves $l$ are slightly hollowed out, as shown at $l^2$ in Fig. 25, to make room or afford a chamber between the two bars for the anvil-block G, along the sides of which the limits of reciprocation of the head H, with which the staple-forming bars are practically integral, about equal the length of the hollowed-out portions $l^2$. The grooves $l$ extend continuously to points below the slots $m$ and $m'$, but should widen slightly in lateral directions toward their lower extremities from above the slots, as shown at $l^3$, Fig. 25. From their lower extremities the grooves $l$ proceed to the lower ends of the bars I and I' as shallower grooves $l^4$, somewhat rounded or oval in form, preferably as indicated in Fig. 35, whereby the inner edges of the grooves are slightly flanged, as indicated, but somewhat exaggerated, at $l^5$, and, more particularly to adapt the staple-formers to permit staples to be driven through work of considerable thickness, the flanged grooves $l^4$ are curved inwardly near their lower extremities, as shown in Fig. 50, and the forming-bar cut away on its rear surface near the lower end to render it springy.

K is the driver, comprising a bar of a width slightly less than that of the space between the opposing faces of the bars I and I', and having flanges $k$ extending laterally from its rear side, which enter the grooves $l$, and the driver is held at its flanges $k$ to permit it to be guided in its reciprocating movements in the grooves $l$ by flat bars L and L', fastened to the face of the reciprocating head H, respectively, in positions to cover the flanges $k$, and the inner edges of which are preferably, but not necessarily, provided on their inner faces with grooves like the grooves $l\ l^4$ in the staple-forming bars I and I', and with which they would coincide. The bar L' is recessed, as shown in Fig. 23, to make room for the laterally-movable wire cutting and gaging mechanism hereinafter described. The forward end of the lever E, Fig. 9, is pivotally connected by a link $i$ with a lug $i'$ on the rear side of the head H to one side of its center, and which projects through the opening in the bed-plate F into the mouth of the hood $w^2$, and the corresponding end of the lever E' is similarly connected with the rear side of the driver K.

From the foregoing description of parts it will be understood that when the shaft B is in motion by the pulley B' being clutched to it the eccentric $D^2$, by regularly rocking the lever E' on its fulcrum afforded by the pin $r^2$, (constituted a fulcrum by the arms $r$ and $r'$ being supported at their opposite ends,) regularly reciprocates the driver K, and that the cam D', through the lever E, irregularly reciprocates the head H, with its staple-formers I and I', along the sides of the anvil-block G.

M' is a bracket, Fig. 1, fastened to a side of the hood $w^2$ to extend laterally therefrom, and having fulcrumed to it at $x^2$ a lever M, bent or curved toward one end, as shown, the bent portion being preferably one-half the length of the straight portion and the fulcrum $x^2$ being provided at a point corresponding with two-thirds of the length of the lever measured from its lower end, so that the extent of sweep of the lower end of the lever will be twice that of the opposite end. These relations are of course subject to change, according to requirement; but the lower end of the lever should always have an extent of sweep equal to twice the thickness of the work to be stitched. A spring $x^3$ serves to afford yielding resistance to the turning of the lever M on its fulcrum, and the end of the bent arm of the lever extends into the path of a lug K', rigid on the front surface of the driver K.

N, Figs. 17 and 18, is the cutter-block, having a guide-pin $h$ extending from its rear side and tongues $h'$ on its upper and lower edges, which enter guide-grooves, respectively, in the upper and lower edges of the blocks N' and $N^2$, secured below and above the cutter-blocks on the face of the head H to the left (looking toward the front of the hood $w^2$) of its longitudinal slot; and when the block N is adjusted in position between its guide-blocks the pin $h$ projects through the horizontal slot $w^6$ in the ear $w^5$ on the bed-plate F and through the oblique slot $w^4$ in the ear $w^3$ on the hood $w^2$.

To the inner end of the knife-block N is pivoted a knife O, Figs. 18 and 19, the cutting-edge O' of which extends across the line of feed of the wire-supply, hereinafter described, which is passed through an opening $u$, formed through the block N near its base, the knife-edge being maintained normally away from the line of feed by a spring $u'$ and being advanced at the proper time to cut the wire by a cam $u^2$, Figs. 18, 22, 27, 28, and 29, on the front surface of the reciprocating head H, the advancement forcing the knife-edge into engagement with a knife-plate $O^2$, (shown clearly in Figs. 20 and 21,) secured in proper position in the block N and permitting the knife O to operate by a shearing cut.

The supply of wire is provided on a spool P, Fig. 1, suitably supported to revolve in the feeding on an arm of the bracket M'. The wire P' is passed from the spool P through an eye $g$, Figs. 1 and 41, secured to the outer edge near the lower end of the lever M, and having extended from it toward the knife-block N a light flat spring $g'$, having an eye $g^2$ on its upper side and overlapping a shorter but similar spring $g^3$, provided with an eye $g^4$ and extending from the outer edge of the block N, to which it is fastened at the base of the opening $u$. The springs $g'$ and $g^3$ thus afford a yielding guide to the opening $u$ in the knife-block for the wire P', which is held against slipping by a spring-cam Q' and fed by the forward movement (produced as hereinafter described) of the lower part of the lever M through the medium of a spring-cam Q, like the cam Q', but supported on the lever, as shown in Figs. 1 and 40, to bear against the wire.

From the foregoing description it will be seen that by manipulating the screw $p'$ to raise or lower the bed-plate F and parts it carries the knife-block N is moved outward or inward the exact or nearly the exact distance the bed-plate is so raised or lowered, owing to the angle of forty-five degrees of the oblique slot $w^4$ in the stationary ear $w^3$. This, as will hereinafter be seen, regulates the length of wire to be fed and cut off by the knife to form staples of particular lengths, and when the block N is moved outward to feed a considerable length of wire to be cut a clamping-finger R, Figs. 38 and 39, which is pivoted at one end to the block N', may be adjusted to extend over and against the length of wire between the knife-block and adjacent staple-former I' to prevent buckling of the wire, and when not required it may be turned out of the way.

S is an arm or bracket, Fig. 2, secured to the front side of the part $w$ of the standard near its base and curving thence in an upward and outward direction, extending below the bed-plate F, where it terminates in a flat rigid bed-plate $f$. From the rear side, near the upper end of the bed-plate $f$ and on opposite sides of the web of the arm S, project stationary studs $f'$, and directly below the studs $f'$, near the lower end of the bed-plate, are elongated openings $f^2$, Fig. 4.

T is a flat reciprocating plate or head having longitudinally along the center throughout one (the rear) side a rectangular recess $e^3$ and a cross-bar $e^4$ at the upper end of the head, let into the sides of the recess to be flush with the faces of such sides and affording a covering for and narrowing the recess where it crosses the same. A similarly-adjusted cross-bar $e^5$ extends across the recess $e^3$ near the center of the head.

In the recess $e^3$ between the two cross-bars is a plate $e^6$, having tongues $e^7$ and $e^8$ formed at its opposite ends to enter the recess between the respective cross-bars, the plate being rigidly fastened to the face of the bed-plate $f$. Recessed dogs U are pivotally supported, as shown, at the upper end of the head T between the cross-bar $e^4$ and base of the recess $e^3$, being normally in the relative positions shown by the full lines in Fig. 7, which they assume by their own gravity, and from which they are raised to the position indicated by dotted lines for the purpose of clinching the ends of a staple in the manner hereinafter described.

Directly below the cross-bar $e^5$ is an open-$e^2$, formed through the head T, and which is overlapped on the rear or recessed side of the head by a plate $e'$, pivotally supported near its upper end in the recess $e^3$, and beveled, as shown in Fig. 6, at its lower end, toward which it is normally held yieldingly away from the base of the recess $e^3$ by a spring $e$, extending against it through the opening $e^2$ from the front side of the plate T.

Below the pivotal plate $e'$ in the recess $e^3$ is a plate $e^9$, rigidly secured to the face of the bed-plate $f$, and having its upper edge beveled to coincide with the bevel on the lower edge of the pivotal plate.

The head T has projecting from its rear side, near its lower end, studs $e^{10}$, Figs. 5 and 6, which project through the elongated openings $f^2$ in the lower end of the bed-plate $f$, and which are yieldingly connected, by stiff springs $d$ with the studs $f'$ on the rear side of the bed-plate, whereby the head T is yieldingly supported directly underneath the head H against the front side of the bed-plate $f$, the upper end of the recess $e^3$ being in direct line with the driver K.

V is the table for supporting the work to be stitched, and which is of a form and construction and sustained by means to adapt it to be readily converted into a saddle. It involves two plates $c$ and $c'$, secured together edge to edge to extend at right angles to each other by means of brackets $b$, fastened to the under sides of the plates, as clearly shown in Fig. 49, to cause the head T to fit edgewise between them, and each having perforations $b'$ and $b^2$, one above the other, in their bases. The plate $c$ is provided with a slot $a$, and a slot $a'$ is provided at the junction of the two plates $c$ and $c'$.

To support the device V as a table, it is screwed through the lower openings $b'$ into coincident threaded openings in the opposite edges of the head T, the slot $a$ being then coincident with and embracing the upper end of the said head. To convert it into a saddle, the screws are removed or loosened and the table caused to straddle the head T, thus bringing the slot $a'$ coincident with and to embrace the upper end of the head, which causes the upper openings $b^2$ to coincide with the threaded openings in the edges of the head, when the screws are adjusted to hold it.

As it may sometimes be desirable, for different thicknesses of wire, to adjust the plates L and L' toward their lower ends closer to or farther from the staple-forming bars I and I', the heads $j$ and $j'$ of the screws $j^2$, Figs. 36 and 37, are concaved peripherally, as shown, and provided circumferentially with worm-threads, with which engage the corresponding threads of a screw $j^3$, supported in a suitable bearing, as illustrated. Turning of the screw $j^3$ in one direction or the other turns the heads $j$ and $j'$ and screws $j^2$ to move the plates L and L' outward or inward toward their lower ends with reference to the bars I and I'.

The operation is as follows: The shaft B is first turned (on pressing upon the pedal C to clutch to the shaft the hub $B^2$) to cause the cam D' and eccentric $D^2$ to actuate the levers E and E' to bring the lower ends of the head H and driver K coincident, (which can only occur when the staple-forming head H and driver are at the lowest extremity of their reciprocating play,) when the screw $p'$ is manipulated to raise or lower the bed-plate F and the driver and staple-forming mechanism it carries for the purpose of gaging their downward play to the thickness of the work or book W to be stitched, and which play is slightly beyond the width of space between the clincher mechanism and upper surface of the book, in order that when the driver and staple-forming head H are pressed against the book they may force through the latter the head T down against the resistance of the springs $d$, Fig. 2, and cause the dogs U to rise, as hereinafter described, to clinch the protruding ends of the driven staple X. The distance of raising or lowering the bed-plate F with reference to the clincher mechanism of course determines the width of space between them, which should, as aforesaid, when the bed-plate F and parts it carries (driver K and head H) are at the lowest limit of their reciprocating play, about equal the thickness of the work. Vertical movement of the bed-plate F a certain distance obviously moves the knife-plate N laterally the same distance. Thus, if the bed-plate F be moved up or down one inch, the plate N will simultaneously be laterally moved outward or inward the same distance, since, being confined against vertical play by its stationary guide-plates N' and $N^2$, it cannot independently move vertically; but as the horizontal slot $w^6$ in the ear $w^5$ moves with the bed-plate F, of which the ear forms a rigid part, it carries the plate N with it, the pin $h$ thereby being moved along the forty-five-degree inclined slot $w^4$ in the immovable ear $w^3$, and thus moving the plate N laterally the same distance that the bed-plate F is moved vertically. Therefore the extent of movement of the plate N with reference to the inner edge of a stationary guide-plate N' or $N^2$ may be used to indicate the thickness of the work to stitch which the machine is adjusted, or the distance of extension of the bed-plate F beyond the upper ends of the stationary angle-plates $o'$ and $o^2$ may be used for the same indication. For the first-named use of the adjustment I provide a gage-plate Y, Fig. 1, on the movable knife-plate N and a similar plate Y', parallel with the plate Y, secured to the stationary guide-plate $N^2$ and extending vertically over the plate N, between which gage-plates the work may be clamped at one edge to gage it. It will be seen that raising or lowering of the bed-plate F in the manner and for the purpose described does not affect the relation between the cam D' and eccentric $D^2$ and their respective levers E and E', the only effect on the latter being to raise or lower them toward their forward ends on their fulcrum-pin $r^2$ through the movement with the bed-plate of the arms $r$ and $r'$ and without reducing or enlarging the extent of their reciprocation. When the width of space to receive the work W has been gaged, as described, (or, if desired, before that time,) the machine is threaded by extending the wire P' through the guide-eyes $g^2$ and $g^4$, thence through the opening $u$, Fig. 18, in the knife-plate N and the openings $m$ and $m'$ in the staple-forming bars I' and I and opening $n$ in the intermediate anvil-block G, and beyond the bar I through a coincident opening in the adjacent flange of the head H, the length of space for the wire to extend beyond the bar I being equal to the extreme length of the space between the knife-plate N when moved laterally to its outward limit and the bar I'. When the machine has been once threaded, the wire does not require to be again manipulated until the supply on the spool P gives out, when, of course, a new supply has to be threaded.

In the initial operation of the machine rotation of the shaft B carries the driver K to descend independently of the head H, and the latter also to descend, but more slowly than the driver, owing to the relations between the eccentric $D^2$ and cam D'. As the bars I and I' descend with the head H, the upper end of the slot $m$ in the bar I (which slot is slightly shorter than the slot $m'$ in the bar I') first comes against the protruding end of the wire P' in its path and bends it downward through the slot against the adjacent side of the anvil-block G. Just before the upper edge of the slot $m'$ reaches the wire P, extending across its path, the cam $u^2$ engages with the pivotal knife O, forcing its cutting-edge O' against the wire and severing it, when it is bent by the staple-forming bar I' through its slot $m'$ against the adjacent side of the anvil-block.

The arrangement whereby the bending of the wire toward its outer or free end is first performed is advantageous, inasmuch as if both bars I and I' were to act simultaneously the severing operation of the knife mechanism would have to precede, and would tend (as in cutting by hand with scissors) to cause the severed section to fly off lengthwise in the direction of its extension, and thereby produce a longer extent of projection from the farther side of the anvil-block than from the opposite side, thus rendering the shanks of the staples of unequal lengths. When the staple-forming bars I and I' have completed the formation of a staple, as described, both they and the driver K proceed to the lowest limit of their reciprocating play and would there engage with the clincher mechanism through the work W if interposed, though such engagement in the initial operation of the machine would be without effect as to stitching the work, since no staple would be in the path of the descending driver. As the bars I and I', after bending the wire at opposite sides of the anvil-block and thus forming the staple X, proceed on their downward course, the inclined channels $l'$ in their opposing faces (and which extend at their lower ends to or about to the rear sides at the upper ends of the slots $m$ and $m'$) engage the bent vertical ends or shanks of the staple, and thereby gradually move its cross-head from the perforation $n$ in the anvil-block down the oblique slot $n'$ by switching the shanks into the grooves $l$, so that by the time the bars I and I' and driver have reached the lowest limit of their play the staple, still held in the mouth of the oblique slot of the anvil-block by the face of the latter being covered by the driver, is in the grooves $l$ with its shank portions. Continued rotation of the shaft B raises the head H, and more rapidly the driver K, the head in rising leading the staple-shanks into the more expanded grooves $l^3$, as indicated in Fig. 30, and the latter rising above the oblique slot $n'$ in the anvil-block, whereby the cross-head of the staple is freed to spring out into the path of the driver, as indicated in Fig. 31, which then descends with the head H, but more rapidly than the latter, (both the driver and head eventually reaching their lowest positions simultaneously,) and drives the staple through the shallower flanged grooves $l^4$ into and through the work W. The flanges on the grooves $l^4$ (assisted by the corresponding grooved flanges, if provided, in the covering-plates L and L') coincide with the extreme ends of the cross-head of the staple near its junction with the shank portions, and because the flanges of the grooves narrow the latter to a width less than that of the wire they cut into and notch the wire near the opposite ends of the cross-head of the staple, as indicated in Figs. 32 and 33, thus holding the staple firmly against the effect of the strain of the driver on the cross-head, tending to bend the latter downward between its extremities, which is prevented by the hold at the notches resisting the tendency of the strain on the cross-head to draw upward in the grooves the shank portions of the staple, and thus lengthen the cross-head sufficiently to enable it to be bent. The rigidity of hold on the staple while being driven and the provision of a close-fitting guide for it throughout the driving operation enable me to drive through exceptionally unyielding or hard work W staples or even continuous straight lengths of wire, even of a very fine quality, without bending or buckling the wire, and I regard the feature of my improvement permitting this as of great importance. It will be observed that the wire P' is unwound from underneath the spool P, the winding on which renders it curved and springy, and that when the bars I and I' bend a length of it against the anvil-block the bending is produced in the contrary direction to the curve of the section of wire, whereby the shanks of the staple have a normal tendency to curve outward. This tendency is restrained, of course, while the staple is confined in the grooves of the forming-bars; but in the driving, especially through work of considerable thickness, (say an inch or more,) it is found that the shanks of the staple spread so much, and thereby pass through the work obliquely, as to present great resistance to the driving. I overcome this tendency by curving inward the groove $l^4$ at the lower end of each staple-forming bar, as shown in Fig. 50, and beveling in an inward and downward direction, as shown at $x^5$ in that figure, the rear surface of each bar toward its lower end, whereby it is rendered springy. When the driver K descends into the curved portions of the grooves $l^4$, it spreads the beveled ends of the bars I and I' slightly apart and effects, as I find, straight driving of the staple. In reaching the lowest extremity of their reciprocation and lodging the staple in the work W the head H and plunger K compress the work against the head T of the clincher device, forcing the latter downward against the resistance of its sustaining-springs $d$, which is permitted by the beveled edge of the pivotal plate $e'$, Fig. 6, passing that of the rigid plate $e$, and which lowers the free ends of the recessed dogs U against the upper end or tongues $e^7$ of the rigid plate $e^6$, thereby raising the dogs on their pivots and causing them to bend toward each other or "clinch" (see Figs 42 and 43) the ends of the staple which protrude into their path from the lower surface of the work W. The rise of the driver K to free the staple (formed as described) from the anvil-block G brought its lug or striker-block K' against the end of the feed-lever M extending into its path, and by striking against the latter actuated the opposite end of the lever M to feed a length of the wire P' from the spool M' through the block N, anvil-block G, and head H, (including the staple-forming bars I and I',) and as the parts descended to drive the staple first formed another staple was formed in the manner already described of the formation of the first staple. So it will be understood that after forming the first staple the machine always has one staple in reserve, which is formed while that produced before it is being driven.

The adjustment higher or lower of the bed-plate F, which, as hereinbefore described, regulates the extent of descent of the driver and head H with reference to the clincher mechanism and the length of wire severed by the knife, also regulates the length of wire fed by the feed-lever M, since the higher or lower the plunger is adjusted by adjusting the bed-plate F with manipulation of the screw $p'$ the higher or less high it will move in its reciprocation with a corresponding turn of the feed-lever by the impingement against it of the lug K'. If, therefore, to illustrate, the bed-plate and parts it carries be adjusted by raising it from any position one-half an inch to adapt the machine to work W of a particular thickness requiring a staple the shanks of which shall, by the half-inch addition to the length of each, be adapted to pass through and be clinched on the under side of the work, the curved arm of the feed-lever will be correspondingly raised on its fulcrum, and the opposite end of the straight part of the lever M (which, as will be remembered should be twice the length of the curved part) will thereby be moved inward a whole inch, thus feeding that additional length of the wire or additional one-half inch on each side of the anvil-block G. It may further be mentioned that when, after the driving operation, the driver and head H rise from the clincher mechanism the springs $d$ raise the head T to its normal position, thereby readjusting the pawls U and other parts of the clincher mechanism to their normal relative positions, and also that when the head H rises it removes the knife-cam $u^2$ from engagement with the knife O, freeing the latter and permitting it to be thrown back out of the path of the feed by the resilience of the spring $u'$.

What I claim as new, and desire to secure by Letters Patent, is—

1. In a book-stapling machine, the combination, with a standard, driving mechanism, and a support for the work, of a bed-plate supporting reciprocating staple-forming mechanism and a reciprocating driver and adjustably supported on the standard, whereby it, with the said staple-forming mechanism and driver, may be raised and lowered with relation to the said support, substantially as and for the purpose set forth.

2. In a book-stapling machine, the combination, with a standard, driving mechanism, and a support for the work, of a bed-plate supporting reciprocating staple-forming and wire-cutting mechanisms and a reciprocating driver and adjustably supported on the standard, whereby it, with the said staple-forming and wire-cutting mechanisms and driver, may be raised and lowered with relation to the said support, substantially as and for the purpose set forth.

3. In a book-stapling machine, the combination, with a standard, driving mechanism, and a support for the work, of a bed-plate F, supporting reciprocating staple-forming mechanism and a reciprocating driver and having a nut $p$, a set-screw $p'$, extending through the nut against a bearing on the standard and adjustably supporting the bed-plate on the standard, and a guide on the standard for the said bed-plate, substantially as and for the purpose set forth.

4. In a book-stapling machine, the combination, with a standard, driving mechanism, and a support for the work, of a bed-plate F, an anvil-block G, secured to the bed-plate and having an oblique slot $n'$, reciprocating staple-forming bars I and I', supported on the bed-plate at opposite sides of the anvil-block and provided with openings $m$ and $m'$ and grooved, substantially as described, plates L and L', secured to extend over the bars I and and I', and a reciprocating driver K, movable in grooves of the staple-forming bars, substantially as and for the purpose set forth.

5. In a book-stapling machine, the combination, with a standard, driving mechanism, a support for the work, and an automatic feed and severing mechanism for the wire, of a bed-plate F and anvil-block G, secured to the bed-plate and having an oblique slot $n'$, reciprocating staple-forming bars I and I', supported on the bed-plate at opposite sides of the anvil-block and provided, respectively, with a longitudinal opening $m$ and a longer longitudinal opening $m'$ and grooved, substantially as described, plates L and L', secured to extend over the bars I and I', and a reciprocating driver K, movable in grooves of the staple-forming bars, substantially as and for the purpose set forth.

6. In a book-stapling machine, the combination, with a standard, driving mechanism, and a support for the work, of a bed-plate F, an anvil-block G, secured to the bed-plate and having an oblique slot $n'$, reciprocating staple-forming bars I and I', supported on the bed-plate at opposite sides of the anvil-block, and provided with openings $m$ and $m'$ and with grooves $l$, $l'$, and $l^3$ and flanged grooves $l^4$, plates L and L', secured to extend over the bars I and I', and a reciprocating driver K, movable in grooves of the staple-forming bars, substantially as and for the purpose set forth.

7. In a book-stapling machine, the combination, with a standard and a support for the work, of a bed-plate F, an anvil-block G, secured to the bed-plate and having an oblique slot $n'$, a reciprocating head H, carrying staple-forming bars I and I', provided with openings $m$ and $m'$ and with grooves $l$, $l'$, and $l^3$ and flanged grooves $l^4$, plates L and L', secured to extend over the bars I and I', a reciprocating driver K, movable in grooves of the staple-forming bars, a driving-shaft B, carrying to rotate with it a cam and an eccentric, and levers E and E', fulcrumed between their extremities and connected at adjacent ends, respectively, with the cam and eccentric and linked at their opposite ends, respectively, to the head H and driver K, substantially as and for the purpose set forth.

8. In a book-stapling machine, the combination, with a standard and a support for the work, of a bed-plate F, an anvil-block G, secured to the bed-plate and having an oblique slot $n'$, a reciprocating head H, carrying staple-forming bars I and I', provided with openings $m$ and $m'$ and with grooves $l$, $l'$, and $l^3$ and flanged grooves $l^4$, plates L and L', secured to extend over the bars I and I', a reciprocating driver K, movable in grooves of the staple-forming bars, a driving-shaft B, carrying to rotate with it a cam and an eccentric, arms $r$ and $r'$, loosely connected at their rear ends with the driving-shaft and connected at their opposite ends with the bed-plate F, and levers E and E', pivotally connected between their extremities with the said arms, connected at their rear ends, respectively, with the cam and eccentric, and linked at their opposite ends, respectively, to the head H and driver K, substantially as and for the purpose set forth.

9. In a book-stapling machine, the combination, with a standard, driving mechanism, and a support for the work, of a vertically-adjustable bed-plate F, an anvil-block G, secured to the bed-plate and having an oblique slot $n'$, a knife-block N, supported on the bed-plate and laterally adjustable thereon automatically by adjustment of the said bed-plate, reciprocating staple-forming bars I and I', supported on the bed-plate at opposite sides of the anvil-block and provided with openings $m$ and $m'$ and grooved, substantially as described, plates L and L', secured to extend over the bars I and I', a reciprocating driver K, movable in grooves of the staple-forming bars, and an automatic feed M for the wire, actuated by the reciprocating driver, substantially as and for the purpose set forth.

10. In a book-stapling machine, the combination of a standard A, having a horizontal portion $w^2$, provided with an ear $w^3$, containing the oblique slot $w^4$, a support for the work, a vertically-adjustable bed-plate F, secured to the part $w^2$ of the standard and having an ear $w^5$, provided with a slot $w^6$, crossing the slot in the ear $w^4$, a laterally-adjustable knife-block N, having a guide-pin $h$ extending through the slots $w^6$ and $w^4$ and carrying a pivotal knife O and supported in guides on the bed-plate, an anvil-block G, secured to the bed-plate and having an oblique slot $n'$, a reciprocating head H on the bed-plate carrying staple-forming bars I and I' at opposite sides of the anvil-block and provided with openings $m$ and $m'$ and grooved, substantially as described, plates L and L', secured to extend over the bars I and I', a cam $u^2$ on the head H for actuating the knife O, a reciprocating driver K, movable in grooves in the staple-forming bars, and a pivotal lever M, extending at one end into the path of the driver K and at its opposite end into the path of the wire to be fed and provided with suitable clamping mechanism for the wire, substantially as and for the purpose set forth.

11. In a book-stapling machine, the combination of a hollow standard A, having a horizontal portion or hood $w^2$, provided with an ear $w^3$, containing the oblique slot $w^4$, a driving-shaft B, journaled in the hood $w^2$ and carrying loosely a driving-wheel B' and an automatic spring-clutch, a brake normally engaging with the spring-clutch and controlled from a pedal C, a cam D' and an eccentric $D^2$ $D^3$, secured upon the shaft to rotate with it, a support for the work, a vertically-adjustable bed-plate F, supported at the front end of the hood $w^2$ and having an ear $w^5$, provided with a slot $w^6$, crossing the slot in the ear $w^4$, a laterally-adjustable knife-block N, having a guide-pin $h$ extending through the slots $w^6$ and $w^4$ and carrying a pivotal spring-controlled knife O and supported in guides on the bed-plate, an anvil-block G, secured to the bed-plate and having an oblique slot $n'$, a reciprocating head H on the bed-plate carrying staple-forming bars I and I' at opposite sides of the anvil-block and provided with openings $m$ and $m'$ and grooved, substantially as described, plates L and L', secured to extend over the bars I and I', a cam $w^2$ on the head H for actuating the knife O, a reciprocating driver K, movable in grooves in the staple-forming bars, a pivotal bent lever M, extending at one end into the path of the driver K and at its opposite end into the path of the wire from the supply supported from the standard, suitable clamping mechanism for the wire, arms $r$ and $r'$, loosely supported at their rear ends on the shaft B and extending at their opposite ends through the hood $w^2$ into engagement with the adjustable bed-plate F, and levers E and E', connected, respectively, at their rear ends with the cam and eccentric, linked at their opposite ends to the head H and driver K, and fulcrumed between their extremities to the arms $r$ and $r'$, the whole being constructed and arranged to operate substantially as and for the purpose set forth.

12. In a book-stapling machine, the combination, with a standard supporting a vertically-adjustable bed-plate carrying reciprocating staple-forming mechanism, a reciprocating driver, and means for actuating the staple-forming mechanism and driver, of staple-clinching mechanism having a spring-held head T, supported in line with the vertically-reciprocating parts of the staple-forming mechanism and vertically-reciprocating driver and carrying pivotal clincher-pawls U and a stationary stop $e^6$ in line with the pawls, substantially as and for the purpose set forth.

13. In a book-stapling machine employing reciprocating staple-forming mechanism and a reciprocating driver supported on a standard and vertically adjustable thereon, the combination therewith of a non-adjustable clincher device having pivotal clincher-pawls U on a vertically-yielding support and a stop in the path of the pawls, whereby when the support for the pawls is lowered by the pressure against it of the reciprocating staple-forming mechanism the pawls are actuated by the stop, substantially as and for the purpose set forth.

14. In a book-stapling machine, the combination, with a standard supporting a vertically-adjustable bed-plate carrying reciprocating staple-forming mechanism, a reciprocating driver, and means for actuating the staple-forming mechanism and driver, of staple-clinching mechanism having a spring-held recessed head T, supported in line with the vertically-reciprocating parts of the staple-forming mechanism and vertically-reciprocating driver and carrying in its recess pivotal clincher-pawls U, a stationary stop $e^6$ in line with the pawls, and a pivotal plate $e'$ in the recess of the head, controlled by a spring $e$, and having its free edge beveled and held by the spring normally against the beveled edge of a stationary plate $e^9$, extending into the recess of the head T, substantially as and for the purpose set forth.

15. In a book-stapling machine, the combination, with a standard supporting a vertically-adjustable bed-plate carrying reciprocating staple-forming mechanism, a reciprocating driver, and means for actuating the staple-forming mechanism and driver, of an arm S on the standard, having a bed-plate $f$, provided with studs $f''$ and elongated openings $f^2$, a recessed head T, having studs $e^{10}$ extending through the openings $f^2$ and connected with the studs $f''$ by springs $d$, clincher-pawls U, pivotally supported in the recess $e^3$ of the said head, a stop $e^6$, secured to the bed-plate $f$ and extending into the recess $e^3$ in line with the pawls, a plate $e'$, pivotally supported in the said recess and extending over an opening $e^2$ in the head T and beveled on its free edge, a spring $e$, extending against the front side of the pivotal plate, and a beveled stop-plate $e^9$, secured to the bed-plate $f$ and extending into the recess $e^2$, with its beveled edge normally against that of the pivotal plate $e'$, substantially as and for the purpose set forth.

16. In a book-stapling machine employing reciprocating staple-forming mechanism, a reciprocating driver supported on a standard, and clincher mechanism, a table V, comprising plates $c$ and $c'$, joined at adjacent edges and slotted at their junction, and one of the plates having a slot $a$, the table being adjustably supported adjacent to the clincher mechanism and movable on its support to bring the slot at the junction or the slot $a$ coincident with the clincher mechanism, thereby to convert the table into a saddle and from a saddle into a table, substantially as and for the purpose set forth.

17. In a book-stapling machine employing reciprocating staple-forming mechanism and a reciprocating driver supported on a standard, the combination therewith of an arm S, extending from the standard and provided with a bed-plate $f$, having yieldingly connected with it a head T in line with the reciprocating staple-forming mechanism and carrying pivotal clincher-pawls U, a stop $e^6$ in the path of the pawls, and a table V, supported on brackets $b$, adjustable on the head T and convertible by its adjustment from a table into a saddle and from a saddle into a table, substantially as and for the purpose set forth.

18. In a book-stapling machine employing a reciprocating driver, staple-forming mechanism, and clincher mechanism, and having parts adjustable with reference to each other to the thickness of the work to be stitched, a gage set automatically by the adjustment of said parts to the width of the work, substantially as described.

19. In a book-stapling machine, the combination, with a standard, driving mechanism, and a support for the work, of vertically-reciprocating longitudinally-grooved staple-forming bars supported on the standard and having the longitudinal grooves curved inward toward their lower ends, the said bars being resiliently yielding toward their lower ends, and a reciprocating plunger K, movable in the grooves of the staple-forming bars, substantially as described.

FREDRICK P. ROSBACK.

In presence of—
  J. H. DYRENFORTH,
  M. J. FROST.